United States Patent
Palanisamy et al.

(10) Patent No.: US 10,678,241 B2
(45) Date of Patent: Jun. 9, 2020

(54) UNSUPERVISED LEARNING AGENTS FOR AUTONOMOUS DRIVING APPLICATIONS

(71) Applicant: GM GLOBAL TECHNOLOGY OPERATIONS LLC, Detroit, MI (US)

(72) Inventors: Praveen Palanisamy, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 15/696,670

(22) Filed: Sep. 6, 2017

(65) Prior Publication Data

US 2019/0072959 A1 Mar. 7, 2019

(51) Int. Cl.
| | |
|---|---|
| *G05D 1/00* | (2006.01) |
| *G05D 1/02* | (2020.01) |
| *G06N 3/04* | (2006.01) |
| *G06N 3/08* | (2006.01) |

(52) U.S. Cl.
CPC ........... *G05D 1/0088* (2013.01); *G05D 1/021* (2013.01); *G06N 3/04* (2013.01); *G06N 3/08* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 8,762,305 | B1* | 6/2014 | Chelian | G06N 3/008 706/14 |
| 10,032,111 | B1* | 7/2018 | Bertram | G09B 9/003 |
| 10,254,759 | B1* | 4/2019 | Faust | G06N 3/006 |
| 2012/0233102 | A1* | 9/2012 | James | G06N 20/00 706/14 |
| 2016/0082597 | A1* | 3/2016 | Gorshechnikov | G06N 5/02 700/253 |
| 2017/0024643 | A1* | 1/2017 | Lillicrap | G06N 3/0454 |
| 2017/0076201 | A1* | 3/2017 | van Hasselt | G06N 3/08 |
| 2017/0228662 | A1* | 8/2017 | Gu | G06N 3/0427 |
| 2018/0032082 | A1* | 2/2018 | Shalev-Shwartz | G05D 1/0055 |

(Continued)

*Primary Examiner* — Jonathan M Dager
(74) *Attorney, Agent, or Firm* — Lorenz & Kopf LLP

(57) ABSTRACT

Systems and method are provided for controlling a vehicle. In one embodiment, a computer-implemented method includes: training an autonomous driving agent is provided, the method including the steps of: extracting, by a processor, information from demonstrations of driving behavior using a neural network; transmitting the extracted information to a generator module; transmitting a real environmental state associated with the demonstrations of driving behavior to a discriminator module; generating, by a processor, environmental state interpretations from the extracted information using the generator module; training, by a processor, the discriminator module to better determine whether the generated environmental state interpretations correspond to the real environmental state, whilst training, by a processor, the generator module to generate an improved environmental state interpretation that the discriminator determines to correspond to the real environmental state; and recovering, by a processor, a reward map using generated environmental state interpretations from the trained generator module.

17 Claims, 8 Drawing Sheets

(56) References Cited

U.S. PATENT DOCUMENTS

| | | |
|---|---|---|
| 2018/0088571 A1* | 3/2018 | Weinstein-Raun ........................ G05D 1/0088 |
| 2018/0120843 A1* | 5/2018 | Berntorp ................. G06N 3/08 |
| 2018/0129974 A1* | 5/2018 | Giering ................. G06N 5/022 |
| 2019/0072973 A1* | 3/2019 | Sun ..................... G05D 1/0221 |
| 2019/0113927 A1* | 4/2019 | Englard ............... G05D 1/0231 |
| 2019/0220028 A1* | 7/2019 | Anderson ............... G06F 30/20 |
| 2019/0250568 A1* | 8/2019 | Li ........................... G06N 3/08 |
| 2019/0258878 A1* | 8/2019 | Koivisto ............. G05D 1/0246 |
| 2019/0258907 A1* | 8/2019 | Rezende ............. G06N 3/0445 |
| 2019/0258918 A1* | 8/2019 | Wang ..................... G06N 3/088 |
| 2019/0266489 A1* | 8/2019 | Hu ........................ B60W 10/20 |
| 2019/0278282 A1* | 9/2019 | Palanisamy ............ G06N 3/006 |
| 2019/0303759 A1* | 10/2019 | Farabet ............. G06K 9/00791 |
| 2019/0310654 A1* | 10/2019 | Halder ................. G05D 1/0088 |
| 2019/0340465 A1* | 11/2019 | Anthony ............... B60W 30/00 |

* cited by examiner

UNSUPERVISED LEARNING AGENTS FOR AUTONOMOUS DRIVING APPLICATIONS

INTRODUCTION

The present disclosure generally relates to autonomous vehicles, and more particularly relates to systems and methods for the unsupervised training of autonomous vehicle driving agents.

BACKGROUND

This section provides background information related to the present disclosure which is not necessarily prior art.

An autonomous vehicle is a vehicle that is capable of sensing its environment and navigating with little or no user input. An autonomous vehicle senses its environment using sensing devices such as radar, lidar, image sensors such as cameras, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles, which incorporate autonomous driving agents, correspond to higher automation levels.

Driving a vehicle requires a good deal of skill, experience and perception from a human driver. Autonomous driving agents must therefore be trained to be able to match, or even surpass, the driving abilities of humans.

Accordingly, it is desirable to obtain a method of training an autonomous driving agent to make equivalent or improved driving decisions as compared to a human driver. Furthermore, it is desirable to obtain a method of training an autonomous driving agent that is largely unsupervised, and does not require extensive labelling of training data. It is also desirable to recover the reasoning (latent motivations) as to why an autonomous driving agent selected a particular driving action in response to a particular environmental state. Other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle.

In one embodiment, a computer-implemented method of training an autonomous driving agent is provided, the method including the steps of: extracting, by a processor, information from demonstrations of driving behavior using a neural network; recovering, by a processor, a reward map from the extracted information; transmitting the extracted information to a generator module; transmitting a real environmental state associated with the demonstrations of driving behavior and the recovered reward map to a discriminator module; generating, by a processor, environmental state interpretations from the extracted information using the generator module; training, by a processor, the discriminator module to better determine whether the generated environmental state interpretations correspond to the real environmental state, whilst training, by a processor, the generator module to generate an improved environmental state interpretation that the discriminator determines to correspond to the real environmental state.

In an embodiment, the method further comprises displaying the improved environmental state interpretation using a display.

In an embodiment, the improved environmental state generated by the generator is used to update the reward map.

In embodiments, wherein the demonstrations of driving behavior are taken from human driven data logs (e.g. stored in computer memory), e.g. from different driving environments and/or with different driving goals.

In an embodiment, the extracted information is extracted using a convolutional neural network. In an embodiment, the convolutional neural network is a deep convolutional neural network.

In an embodiment, the reward function is recovered using deep inverse reinforcement learning via a deep inverse reinforcement learning module.

In an embodiment, the training of the discriminator module is performed using a loss or cost gradient function.

In an embodiment, the training of the generator module is performed using a loss or cost gradient function.

In an embodiment, the method further comprises the step of transmitting the extracted information to the discriminator module, and the discriminator module is configured to determine if the generated environmental state interpretation corresponds to the extracted information.

In an embodiment, the sensor includes an optical camera. In an embodiment, the sensor includes a LIDAR system. In an embodiment, the sensor includes a RADAR system.

In an embodiment, a system for training an autonomous driving agent is provided, the system comprising a neural network configured to extract information from demonstrations of driving behavior; a deep inverse reinforcement learning module configured to recover a reward map from the extracted information; a generator module configured to generate an environmental state interpretation on the basis of the extracted information; and a discriminator module configured to use the recovered reward map, at least in part, to determine if the generated environmental state interpretation corresponds to a real environmental state associated with the extracted information.

In an embodiment, the system further includes a display configured to display the generated environmental state interpretation.

In an embodiment, the deep inverse reinforcement learning module is configured to update the reward map on the basis of the generated environmental state interpretation.

In embodiments, the system predicts human-like interpretation of a driving scene using the recovered reward map and the discriminator module.

In embodiments, the deep inverse reinforcement learning (DIRL) module recovers the reward map from human driving data logs (which contain environmental states and/or actions/demonstrations). The discriminator module uses the recovered reward map together with a true environment state to discriminate an output of the generator module.

In embodiments, the DIRL module uses the recovered reward function (or motivation maps) to select a policy (which prescribes what action to take given a sensed environmental state) during run-time/test-time/after-deployment when there is no human to demonstrate. The autonomous driving agent uses the policy to send control commands and/or actuate the autonomous vehicle.

In an embodiment, the neural network comprises a deep convolutional neural network.

In an embodiment, the deep inverse reinforcement learning module is configured to recover the reward map via deep inverse reinforcement learning.

In an embodiment, the discriminator module is configured to iteratively improve the determination of whether the generated environmental state interpretation corresponds to a real environmental state on the basis of a loss or cost function.

In an embodiment, the generator modul&is configured to iteratively improve the determination of whether the generated environmental state interpretation corresponds to a real environmental state on the basis of a loss or cost function.

In an embodiment, the discriminator module is further configured to determine if the generated environmental state interpretation corresponds to the extracted information.

In an embodiment, the discriminator module is configured to iteratively improve the determination of whether the generated environmental state interpretation corresponds to the extracted information on the basis of a loss or cost function.

In an embodiment, the sensor includes an optical camera. In an embodiment, the sensor includes a LIDAR system. In an embodiment, the sensor includes a RADAR system.

In an embodiment, a vehicle is provided, the vehicle including: a sensor configured to sense information relating to features of the environment state surrounding the vehicle; a neural network configured to extract information from the sensor information; a trained autonomous driving agent configured to determine a policy of driving actions based on the extracted information; and a generator module configured to generate an environmental state interpretation on the basis of the extracted information.

In an embodiment, the vehicle further includes a discriminator module configured to determine if the generated environmental state interpretation corresponds to the real environmental state sensed by the sensor, wherein the discriminator module is further configured to store the determination.

In an embodiment, the discriminator module is configured to store, in a memory, the generated environmental interpretation and the associated real environmental state upon which the generated environmental interpretation was based.

In an embodiment, the sensor includes an optical camera. In an embodiment, the sensor includes a LIDAR system, in an embodiment, the sensor includes a RADAR system.

In an embodiment, the neural network is a deep convolutional neural network.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses of the invention. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a neural network, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
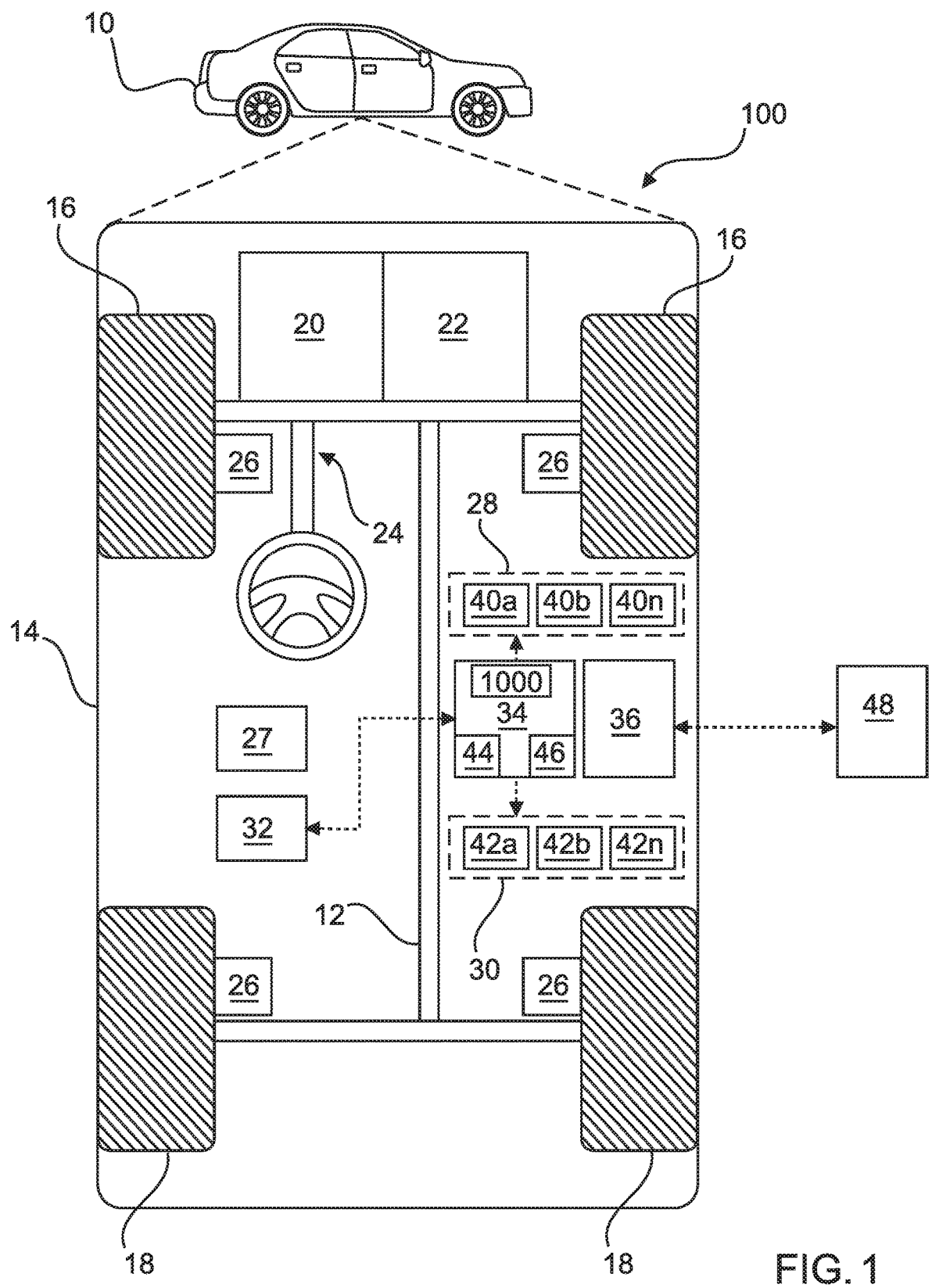
FIG. 1 is a functional block diagram illustrating an autonomous vehicle having an autonomous driving agent, in accordance with various embodiments.

With reference to FIG. 1, an autonomous driving system shown generally at 100 is associated with a vehicle 10 in accordance with various embodiments. In general, the autonomous system 100 includes an autonomous driving agent module 1000 configured to determine a driving action based upon sensed environmental conditions. The autonomous driving agent intelligently controls the vehicle 10.

As depicted in FIG. 1, the vehicle 10 may include a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the autonomous driving agent module 1000 is incorporated into the autonomous vehicle 10. The function of the autonomous driving agent module 1000 will be described in more detail below. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The communication system 36 may be configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46, each of which may be associated with the autonomous driving agent module 1000. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. The control of the components of the autonomous vehicle 10 may be determined on the basis of driving decisions which are made, via the processor 44, by the autonomous driving agent module 1000, as shall be explained in more detail below. Although only one controller 34 and processor 44 is shown in FIG. 1, embodiments of the autonomous vehicle 10 can include any number of controllers 34 and processors 44 that communicate over any suitable communication medium or a combination of communication mediums and that cooperate to process the sensor signals, perform logic, calculations, methods, and/or algorithms, and generate control signals to automatically control features of the autonomous vehicle 10.

In an embodiment, the autonomous driving agent 1000 is responsible for controlling components of the autonomous vehicle 10 in a desired manner (hereinafter referred to as a "driving action") for a particular environmental state surrounding the autonomous vehicle 10.

In order to choose a series of suitable driving actions for the particular environment surrounding the autonomous vehicle 10, the autonomous driving agent 1000 should be able to solve a sequence of multi-body problems for which there is a large degree of uncertainty. Specifically, the number of vehicles surrounding the autonomous vehicle 10 in a particular environmental state may be highly variable. The geometric configuration of these surrounding vehicles, and the future movement of these surrounding vehicles may also be highly variable. As used herein, the term "environmental state" defines a temporal "snapshot" of the information that is available to an autonomous vehicle from its sensors.

In order to solve this sequential decision-making problem, a Markov decision process (MDP) may be used.

An ordinary MDP defines a number of variables, such as S, A, T, D and R. Here, S is a set of environmental states, A is a set of actions (such as driving actions) that may be performed in each state, T is a set of state transition probabilities (which define the state transition distribution upon performing action ax in state $s_x$), D is the initial state distribution (from which an initial environmental state so is defined), and R is the reward function. The reward function R may be expressible as a linear or non-linear combination of weighted features θ, and, in autonomous driving applications, the reward function may be associated with a desired driving behavior (such as collision avoidance behavior).

For autonomous driving applications, the weighted features θ may correspond to differential environmental "features" or "cues" in the environmental state, such as whether the autonomous vehicle is driving in the right-hand lane, whether another vehicle has just changed lanes in front of the autonomous vehicle, the velocity of a nearby vehicle, etc.

A MDP "policy" π is a mapping from environmental states S to probability distributions with respect to actions A. Starting from state so and then progressing through a random state sequence $s_1$, $s_2$, etc., to a final state $s_{goal}$, it is possible, by taking into account actions $a_0$, $a_1$, etc. defined by a particular policy π, to determine the weighted feature θ expectations for that particular policy π. This weighted feature expectation calculation may be performed for multiple policies it. Since the reward function R is normally expressible as a linear combination of the weighted features θ, it is then possible to choose an optimal policy π that maximizes the expected value of the reward function R in terms of these weighted features θ. This optimal policy selection takes into account the inherent uncertainties associated with driving—a policy of driving actions is chosen to maximize an accumulation of the expected value of R (i.e., the expected value of the reward over a future time period is maximized, starting from an initial state so and progressing towards the final state $s_{goal}$).

However, it is not optimal for a designer to "hand-craft" the structure of the reward function R, since this may lead to a sub-optimal policy π being selected by the MDP. In other words, no matter how accurate the MDP process is in selecting the correct policy π for a particular environmental state in order to maximize the expected value of a particular reward function R, if the structure of the reward function R being maximized is incorrect then an incorrect policy π of driving actions may be chosen.

In order to overcome this problem and ensure a higher probability of a correct driving action being selected by the MDP, an MDP may be defined without a set reward function R (MDP/R). An agent being trained using this MDP/R may then be presented with samples of human expert driving behavior for particular environmental states. On the basis of the MDP/R, the presented environmental state (which includes the environmental features) and the presented expert driving behavior, the agent must then determine a policy it which is maximized by the expert's chosen sequence of driving actions for the presented environmental state.

In an embodiment, this policy determination is accomplished using deep inverse reinforcement learning (DIRL). In DIRL, random policies it are selected by the agent, and each policy is compared to an initial "guess" of the reward function being optimized by the expert's sequence of driving actions. The agent then iteratively computes potential reward functions R which are maximized by the expert's sequence of driving actions behavior to a greater extent than the previous "best-guess" reward function determined by the agent. In this manner, the structure of the reward function can be iteratively determined, and the latent motivation behind the expert's sequence of driving actions can be recovered from this determined reward function.

As an example, during training of the autonomous driving agent module 1000, the autonomous driving agent module 1000 may be presented with a demonstration of an expert driver decreasing in speed in a particular environmental state (for example, an environmental state which includes a vehicle directly in front of the expert driver rapidly decreasing in speed). Using DIRL, the autonomous driving agent 1000 will recover the structure of the reward function (the accumulation of which reward function would be maximized by a policy n describing a series of driving actions A which resulted in the vehicle decreasing in speed in the manner demonstrated by the expert behavior), and therefore also recover the latent motivation of the expert driver (avoiding a collision with the other vehicle). Reward functions are generally recovered in the form of a tensor.

Figure 2:
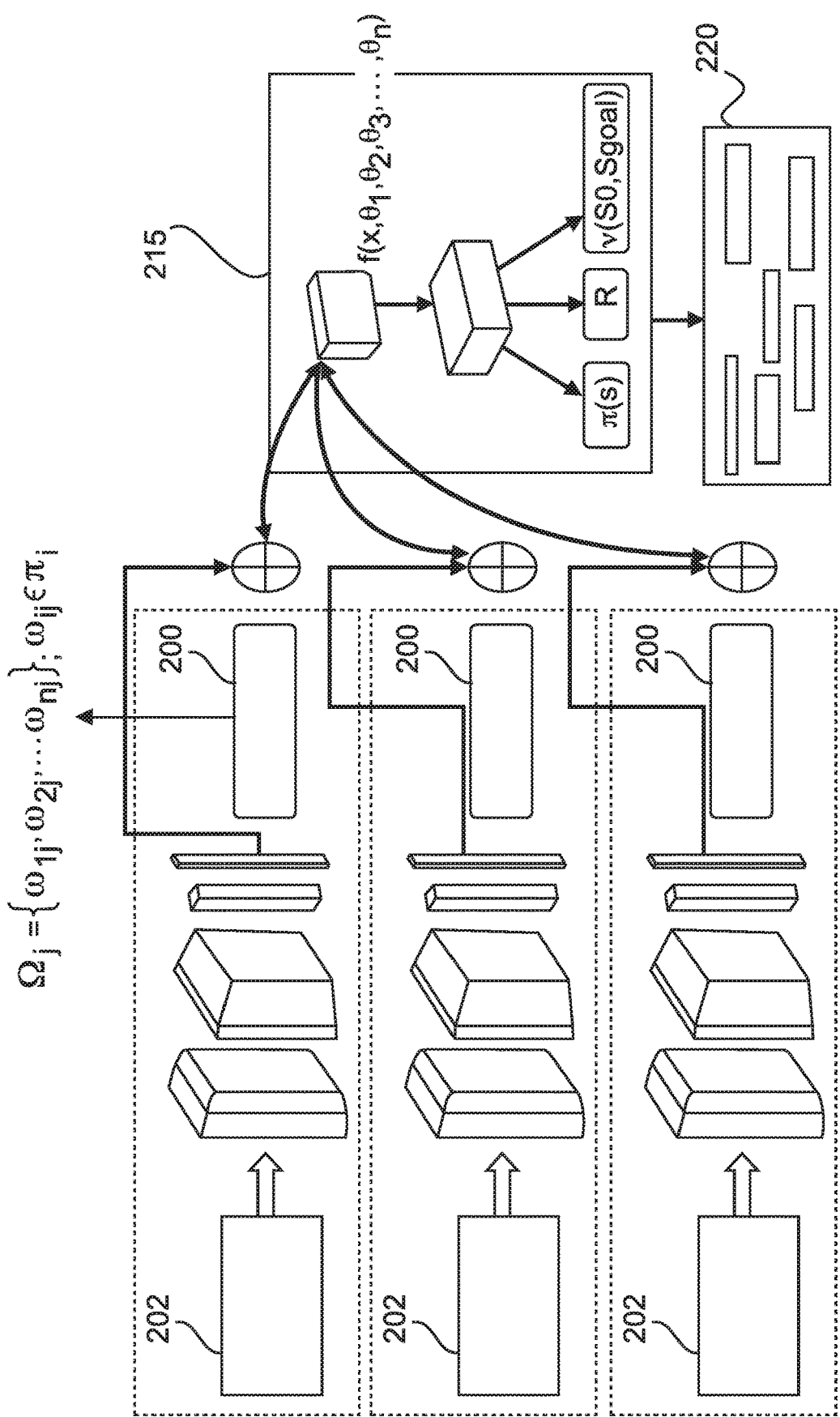
FIG. 2 is a block diagram illustrating how expert driving demonstrations many be used to train an autonomous driving agent in accordance with various embodiments.

An embodiment of the DIRL technique used for training the autonomous driving agent 100 is shown in FIG. 2. As shown in FIG. 2, a DIRL agent 215 is presented with a plurality of driving behavior demonstrations 200 from a plurality of expert drivers in different driving environmental states 202. In an embodiment, the DIRL agent 215 performs a MDP/R process to recover the reward function R in the form of a reward tensor map 220 on the basis of the dataset of the driving demonstrations 200. This reward tensor map 220 associates a generalized environmental state 202, characterized by some features θ of interest in the generalized environmental state 202 to a particular policy π of driving actions A that will maximize the expected reward function value for that generalized environmental state 202. In other words, the reward tensor map 220 allows for a decision to be made regarding the optimal policy of driving actions A in any given environmental state S.

Specifically, all of the demonstrations from a particular environmental state 202 (for example, the jth environmental state) may be incorporated into a dataset $\Omega_j$. In an embodiment, the set of demonstrations would include all of the demonstration feature weights w from this jth environments, such that: $\Omega_j=\{w_{1j}, w_{2j}, \ldots w_{nj}\}$, and can be used to interpolate the policies π followed by each demonstrator in the jth environment. This interpolation may be done by estimating a reward function approximator r, which is a function of the information extracted from the demonstrated expert behavior x, and the weighted features θ, such that $r \approx f(x, \theta_1, \theta_2, \ldots, \theta_n)$. In an embodiment, the reward function R may also be updated using a universal value function $V(s_0, s_{goal})$, which function is used to maximize the expected value of the reward function R given an initial state $s_0$ and a goal state $s_{goal}$.

In this manner, the determined policies π of driving actions A which are followed by each individual demonstrator in a particular environment 202 can be recovered and then generalized, using the DIRL module 215, to recover the reward tensor map 220. The recovered reward tensor map 220 will result in an autonomous driving agent module 1000 being capable of determining a preferred policy π of driving actions A for any future-encountered environmental state 202.

In order to understand the latent motivations behind the configuration of the recovered reward tensor map 220, a supervisor may label certain features being presented to the DIRL module 215 with the driving demonstrations. Labelling of certain important features θ in the presented driving demonstrations 200 would allow the supervisor to determine why the reward map is recovered in a particular manner by the driving agent. One example of an important feature θ that may be labelled by a supervisor would be a vehicle braking sharply in front of the autonomous vehicle 10. The recovered reward map would reward an evasive maneuver in such an environmental state, thereby indicating to the supervisor the latent motivation behind the evasive maneuver.

In another example, if a presented environmental state 202 contains two vehicles, and the geometric configuration of these two vehicles caused the presented expert driver behavior to reduce vehicle speed, a supervisor may manually label the environmental state 202 to indicate to the DIRL agent 215 that there are two vehicles in the presented environmental state 202 and that these vehicles are in a particular geometric configuration. The labelling then allows the DIRL module 215 to recognize the features θ which caused the expert driver to reduce the vehicle speed.

Labelling of training data is a time-intensive process. A large amount of supervision time would be needed to label the multiple environmental states 202 for each of the multiple driving demonstrations 200 required to properly recover the latent motivations behind the recovery of a reward tensor map 220 via a DIRL process using a DIRL agent.

Figure 3:
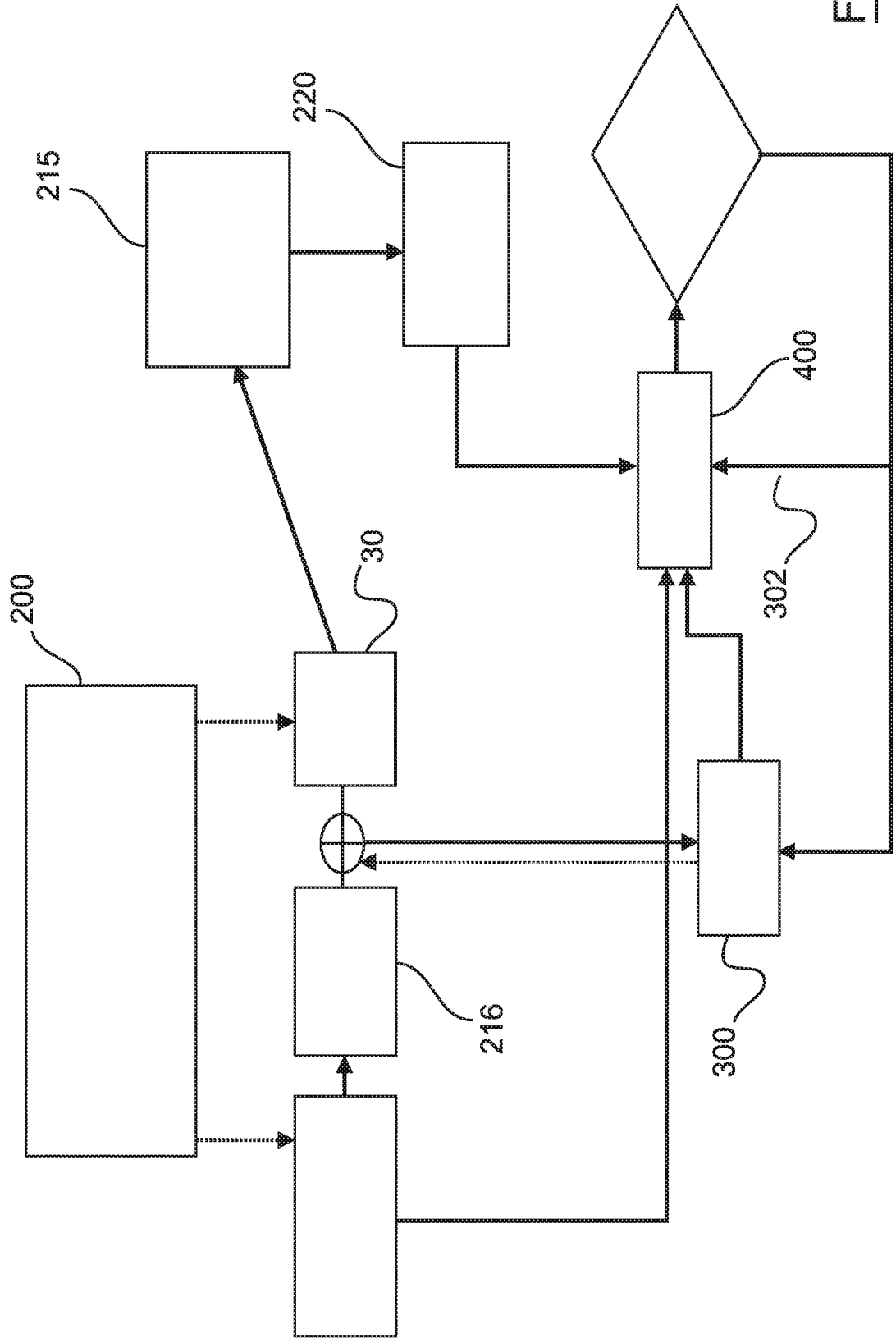
FIG. 3 is a flowchart illustrating a method of training an autonomous agent in accordance with various embodiments.

In an embodiment, an adversarial training procedure may be used to avoid the need to label training demonstrations for the DIRL agent 215. An embodiment of such an adversarial training procedure is shown in FIG. 3. Referring to FIG. 3, an adversarial training procedure includes the use of a generator module 300. As used herein, the term "generator module" refers to a module which is given the learning task of generating environmental interpretations 302 from extracted sensor information from the sensor system 28. The adversarial training procedure also includes the use of a discriminator module 400. As used herein, the term "discriminator module" refers to a module which is given the learning task of determining whether or not a generated environmental interpretation 302 corresponds to a realistic environmental state.

As shown in FIG. 3, sensor information related to the demonstrations 200 in the different environments 202 may be sent to a neural network 216. In an embodiment, the neural network 216 extracts information, such as expressive cues, from the demonstration information. In an embodiment, the demonstration information is in the form of video footage from an optical camera. In an embodiment, the neural network 216 is a deep convolutional neural network, and the extracted information output by the neural network 216 relates to high-level feature recognition of frames of the video footage from an optical camera. The manner in which this high-level feature recognition is performed is explained in more detail below.

Additionally or alternatively, the demonstration information may be a series of LIDAR readings. Additionally or alternatively, the demonstration information may include other types of sensor information, such as radars, global positioning system, thermal camera, ultrasonic sensor, inertial measurement unit, and/or other types of sensor data.

The features θ (such as vehicle positions, traffic lights, etc.) and other environmental expressive cues which are extracted from the demonstration information by the neural network 216 may be artificially weighted towards the expert driver's behavior in the MDP/R process of the DIRL agent 215. This weighting may eliminate the need to accurately sense the environment and provide features associated with the kinematics of objects, the rules associated with traffic signs, etc. Referring to FIG. 3, in an embodiment, information from the demonstrations 200 is transmitted, via the neural network 216, to the DIRL agent 215. Furthermore, the recorded expert's policy of driving actions A recovered from recordings of the actuator system 30 of the expert's vehicle. In an embodiment, the DIRL agent 215 is configured to use the extracted information and multiple expert's policy of driving actions to recover the reward map 220.

In an embodiment, the extracted information is also transmitted to a generator module 300. In an embodiment, the generator module 300 also includes a deep convolutional neural network. The generator module 300 is configured to generate an interpretation of the presented environmental state 202 on the basis of the extracted information from the neural network 216.

Figure 4:
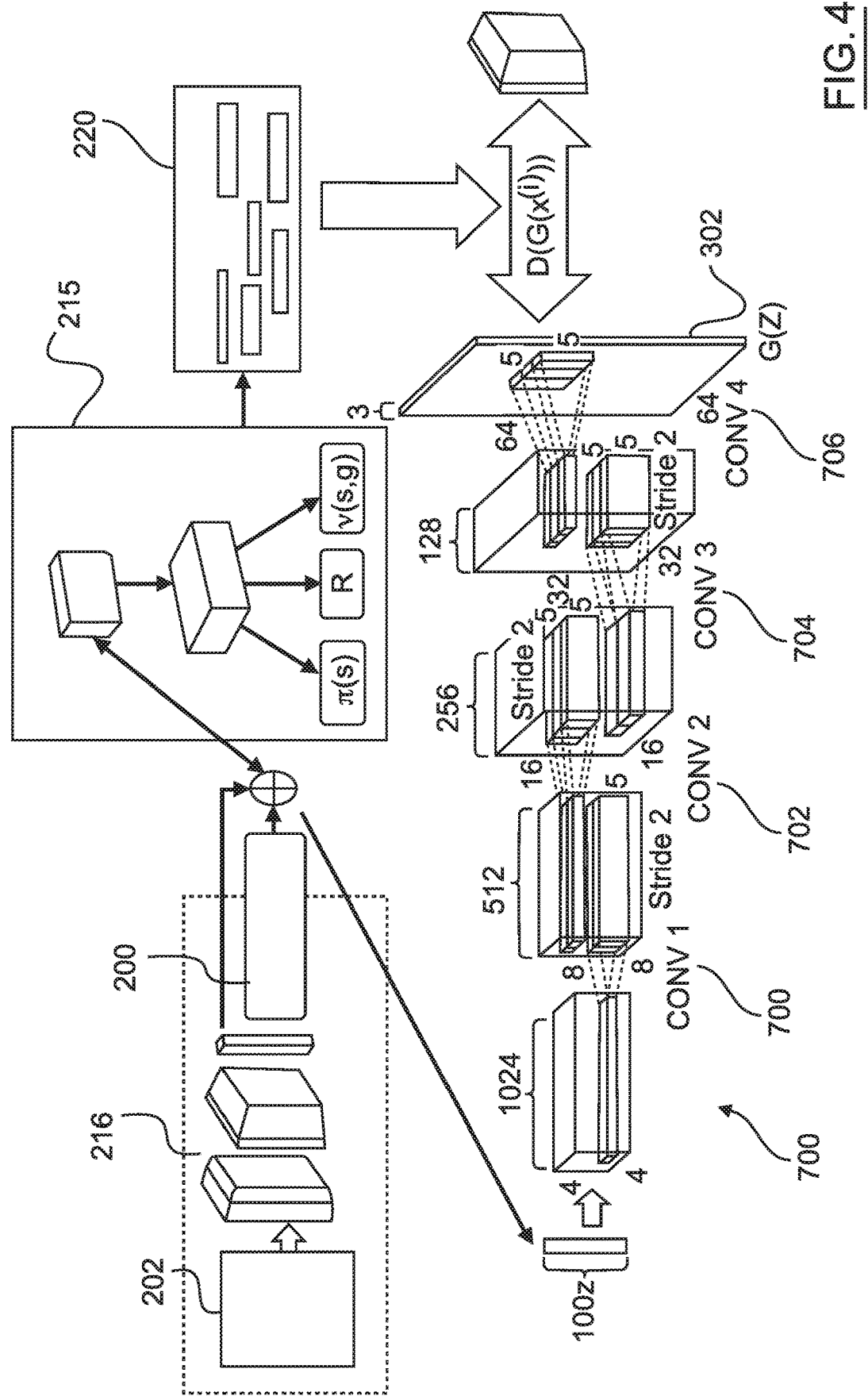
FIG. 4 is a schematic illustrating how environmental interpretations may be generated by a generator module as part of an adversarial training process in accordance with various embodiments.

Referring now to FIG. 4, the details as to how the generator module 300 is configured to generate an interpretation of the presented environmental state 202 on the basis of the extracted information from the neural network 216 are presented. In an embodiment, the generated environmental interpretation 302 is based on a generator function G(z). In an embodiment, the generator module 300 includes a series of hidden convolutional layers 700, 702, 704, 706 (CONV layers). Each of these CONV layers 700, 702, 704, 706 may extract progressively higher-level features from the extracted information from the neural network 216. In the embodiment shown in FIG. 4, four hidden CONV layers 700, 702, 704, 706 are used. In an embodiment, the CONV layers 700, 702, 704, 706 all have the same stride value. In another embodiment, the CONV layers 700, 702, 704, 706 comprise different stride values. In the embodiment shown in FIG. 4, each CONV layer 700, 702, 704, 706 has a stride value of 2, such that, over 4 CONV layers, a 4×4×1024 interpretation is projected and reshaped into a 64×64×3 interpretation.

In an embodiment, the output of the final CONV layer 706 of the generator module 300 corresponds to the generated environmental interpretation 302 of the environment 202, based on the extracted information from the neural network 216. This environmental interpretation 302 includes the agent's own "labelling" procedure—in other words, the generator module 300 labels the demonstration driving behavior 200 through the environmental interpretation generation process.

Referring back to FIG. 3, the generated environmental interpretation 302 is then passed to the discriminator module 400. The raw sensor information (which, in an embodiment, is raw optical camera footage) is also passed to the discriminator module 400. The discriminator module 400, which in an embodiment also includes a neural network, is configured to compare the generated environmental interpretation 302 to the "real" environmental state 202 presented in the raw sensor information. The discriminator module 400 is configured to determine if the generated environmental interpretation 302 correlates to a realistic environmental state on the basis of a discriminator function $D(G(x^{(i)}))$. This discriminator function may be an iterative function.

In an embodiment, and as shown in FIGS. 3 and 4, the discriminator module 400 may also be provided with the extracted information from the neural network 216. In this embodiment, the discriminator module 400 is configured to determine if the generated environmental interpretation 302 corresponds not only to a generally realistic environmental state, but also to the actual real environmental state 202 presented with the sensor information from the driving demonstrations 200.

As detailed above, the discriminator module 400 may also include a neural network. In an embodiment, the discriminator module 400 may include a series of hidden convolutional layers (CONV layers), in a reverse, "mirror image" of the generator module 300.

In an embodiment, the generator module 300 and discriminator module 400 are both trained to improve their learning objectives.

In other words, the generator module 300 must learn to perform two tasks correctly. Firstly, the generator module 300 must learn to be able to generate a "realistic" environmental state interpretation 302 from the extracted information from the neural network 216. Secondly, the generator module 300 must be able to generate an environmental interpretation 302 that correlates to the raw sensor information transmitted to the discriminator module 400. The discriminator module 400 must learn to perform the task of correctly determining whether or not a generated environmental interpretation 302 correlates to a generally realistic environmental state. Furthermore, in an embodiment, the discriminator module 400 must also learn to perform the task of correctly determining whether or not a generated environmental interpretation 302 correlates to the environmental state presented with the raw sensor information.

In order to train both the generator module 300 and discriminator module 400 to perform these tasks, the generator module 300 and discriminator module 400 are trained as adversaries. Specifically, the generator module 300 is giving the specific learning objective of generating an environmental interpretation 302 from the extracted information that will pass the discrimination test of the discriminator module 400. Respectively, the discriminator module 400 is given the learning objective of correctly determining whether or not a generated environmental interpretation 302 correlates to a realistic environmental state, or, in an embodiment, the actual environmental state 200 presented with the raw sensor information.

The generator module 300 and the discriminator module 400 are then iteratively updated. Specifically, the environmental interpretations 302 generated by an "initial" generator function are evaluated by an "initial" discriminator function. On the basis of the determination of the initial discriminator function, the generator function is then updated, for example by using a loss or cost function, such that the generator function is more likely to generate an environmental interpretation from the extracted information that will pass the discrimination test of the "initial" discriminator function.

In an embodiment, the loss or cost function is a function that quantifies the error of the performance of the generator module 300 or the discriminator module 400. In an embodiment, the loss or cost function may determine the difference between the generated environmental interpretation 302 and a pre-determined "ideal" realistic environmental interpretation. In an embodiment, the loss or cost function is differentiable with respect to variables associated with the generated environmental interpretation, such that the error in the loss or cost function may be minimized via a gradient descent method.

When the generator function of the generator module 300 is updated to an accuracy level where the majority of the generated environmental interpretations "pass" the discriminator function test of the discriminator module 400, the updating of the generator function is then paused. The discriminator function of the discriminator module 400 is then iteratively updated, for example by using another loss or cost function, such that the discriminator function is more likely to correctly determine that a generated environmental interpretation correlates to a realistic environmental state. When the discriminator function is updated/optimized to a certain level of accuracy, the updating of the discriminator function is paused, and the updating of the generator function is then resumed on the basis of the improved discriminator function, and so on.

In this manner, both of the discriminator and the generator functions are updated to a point where the generator function of the generator module 300 will almost always generate an environmental interpretation 302 that correctly corresponds to a realistic environmental state 202 based on the extracted sensor information from the neural network 216. At this point, the generator and discriminator modules 300, 400 can be considered as being trained.

Figure 5:
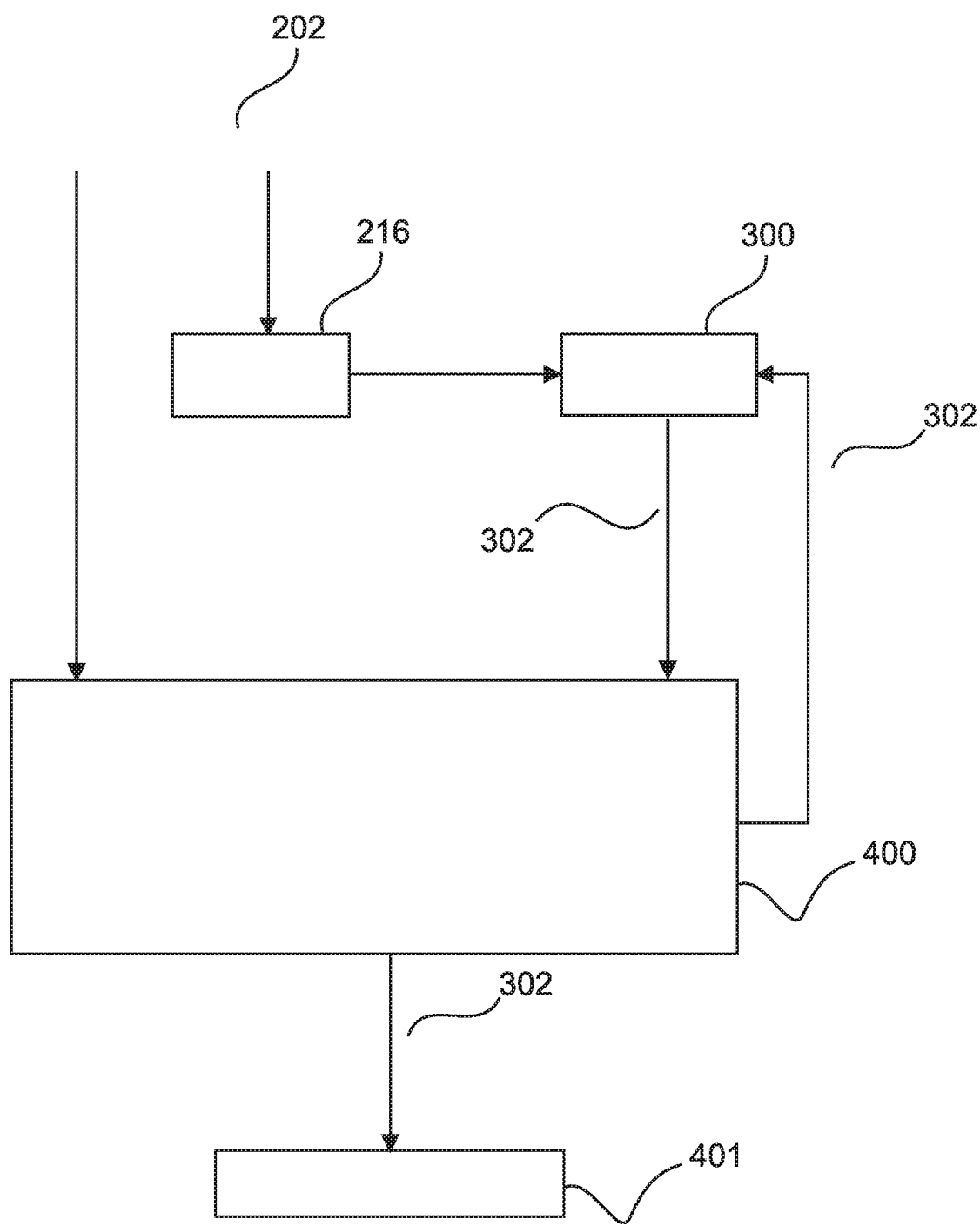
FIG. 5 is a flowchart showing how a generator module and discriminator module may be trained as adversaries in accordance with various embodiments.

A dataflow diagram showing the adversarial nature of the generator and discriminator modules 300, 400, is shown in FIG. 5. In the embodiment of FIG. 5, the demonstration information 200 is transmitted to the neural network 216 and also to the discriminator module 400. The discriminator module compares the generated environmental state interpretation 302 generated by the generator module 300 to the real environmental state information 200 using the discriminator function. If the output of the discriminator module is that the generated environmental interpretation 302 does not correspond to the real environmental state 202, the discriminator module 400 rejects the generated environmental state interpretation 302. The generator module 300 then learns, on the basis of this rejection, that the method of generation for this particular interpretation is flawed in some manner, and therefore generates a new environmental interpretation 302 that includes a perturbation with respect to the rejected environmental interpretation 302. In an embodiment, the generation of the new environmental interpretation 302 includes a Monte Carlo-style process to generate the perturbed new environmental interpretation.

If the output of the discriminator module 400 is that the generated environmental state interpretation corresponds to the real environmental state interpretation, the discriminator module stores the real environmental state and associated generated environmental interpretation 302 to a memory. The stored real environmental state and associated generated environmental interpretation are then used to train the discriminator module 400 to better discriminate the generated environmental interpretations, thereby reducing the probability of a "false positive" result from the discriminator function.

After a plurality of iterations of this adversarial training procedure, the generator module 300 will be improved to a point where most of the generated environmental state interpretations 302 will pass the comparison test applied by the improved discriminator function of the improved discriminator module 400 (depending on the chosen training criteria). The generator module 300 can then be considered as "trained".

The trained generator module 300 may then be used to generate accurate environmental state interpretations 302 from the extracted information of the neural network 216. The extracted information is, in embodiments, taken from logged human driving data. There is no need for special annotations or labelling of the logged human driving data for use by the trained generator module 300. In this manner, the autonomous driving agent can predict human-like interpretation of the driving scene without the need for a human to demonstrate what he would do in such a situation or why.

Specifically, as shown by the dashed arrow in FIG. 3, the accurate generated environmental interpretation 302 from the trained generator module 300 may then be used as an input to the DIRL module 215 for performing the above-described DIRL learning process. As a result of using the trained generator module 300, the presented expert driving demonstrations do not need to be labelled by a supervisor to be used in the DIRL learning process. As such, the recovery of the reward tensor map 220 from the sets of driving demonstrations 200 may be achieved in a largely unsupervised manner. In other words, all that is needed to recover the reward tensor map 220 is a dataset of expert driving behavior demonstrations 200—no labelling of these driving behavior demonstrations 200 is required.

Figure 6:
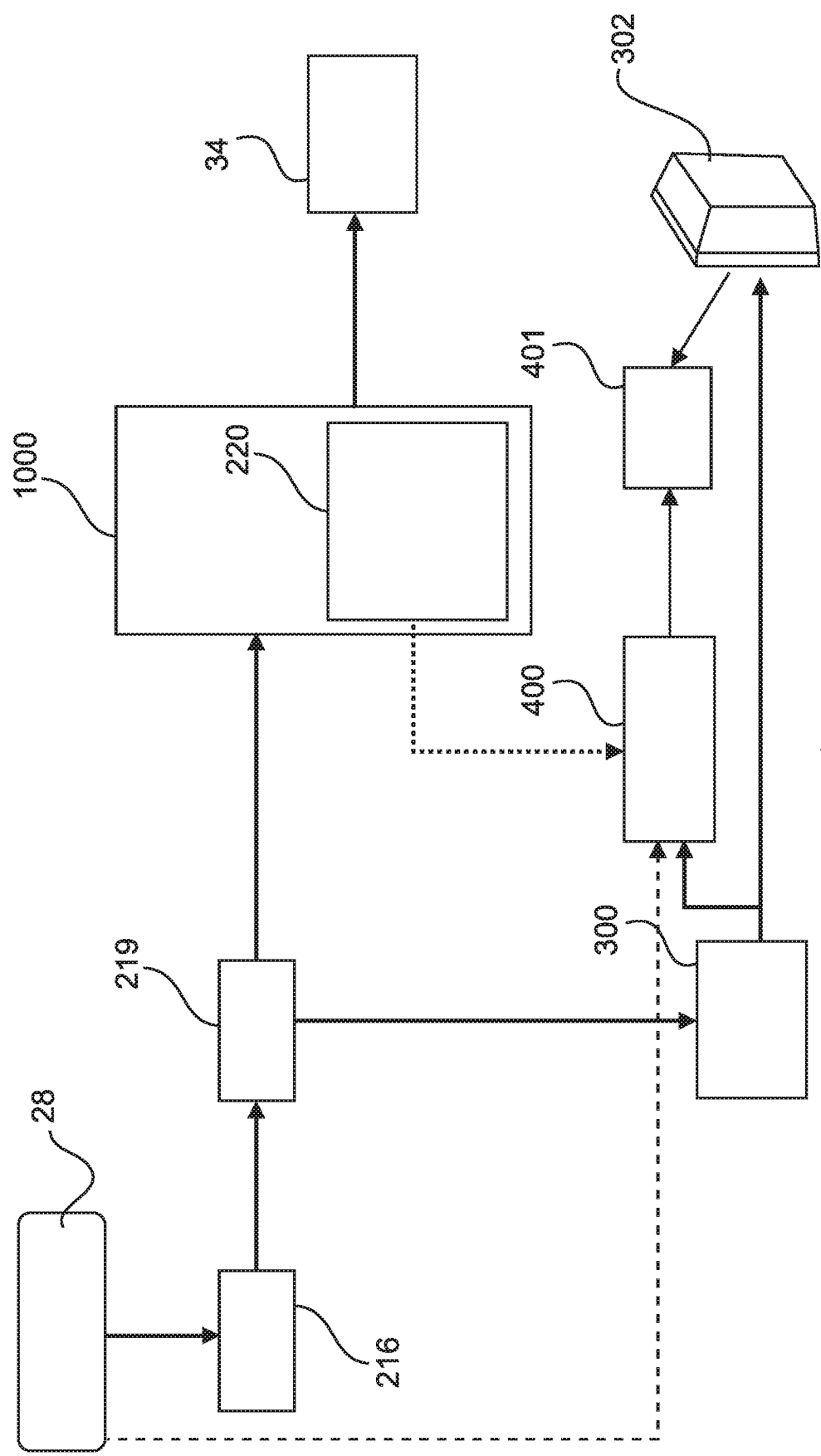
FIG. 6 is a block diagram illustrating how an autonomous agent trained in accordance with various embodiments may be incorporated into an autonomous vehicle.
Figure 7:
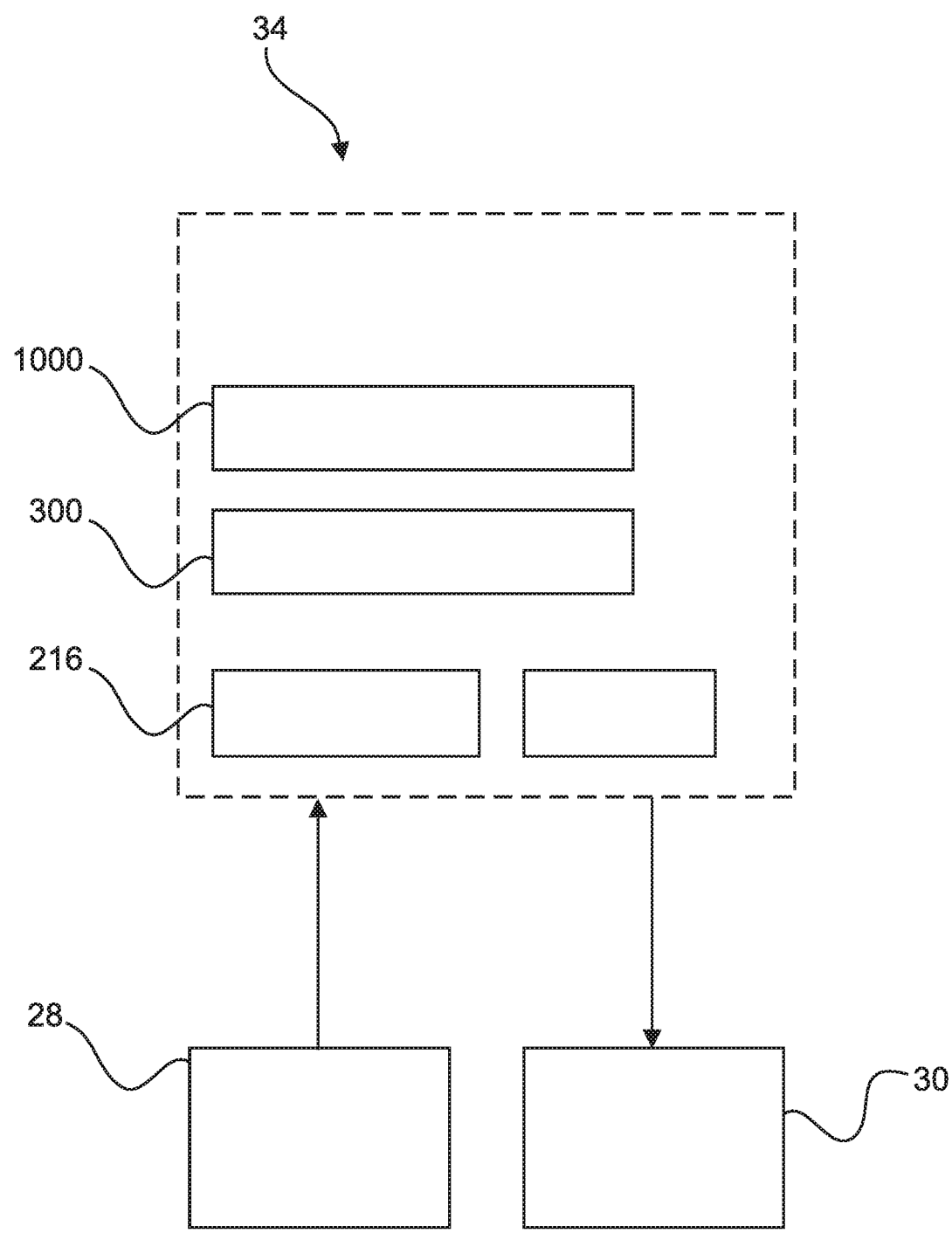
FIG. 7 is a block diagram illustrating how an autonomous agent trained in accordance with various embodiments may be incorporated into an autonomous vehicle.

After recovery of the reward tensor map 220, the trained autonomous driving agent, which incorporates the recovered reward map 220, may subsequently be deployed in an autonomous vehicle 10. As shown in FIGS. 6 and 7, an autonomous vehicle 10 may be provided with a sensor system 28, which may include an optical camera. Environmental state information 202 about features of the environment may be sensed using this sensor system 28. Information regarding features of the environment may be extracted using a neural network 216. The autonomous driving agent 216 then implements a policy of driving actions A on the basis of this extracted information through the use of the recovered reward map 220. The extracted information may also be passed to the trained generator module 300 via the use of a data splitter module 219. The trained generator module 300 which generates an environmental interpretation 302 corresponding to the real environmental state on the basis of this extracted information. The generated environmental interpretation 302 may then be stored in a memory 401 and later be used to understand the reasoning behind why the agent chose a particular policy of driving actions for a particular environmental state interpretation. In other words, by having access to the environmental state interpretation upon which the agent is basing the policy of driving actions, it is possible to understand which features θ of that environmental state interpretation caused the agent to choose a particular policy of driving actions. The trained discriminator module 400 may also be incorporated in the vehicle 10, and the output of the discriminator module 400 may also be stored in the memory 401 for later updating of the discriminator module 400, if desired.

This understanding of which features of the environmental state interpretation caused the agent to choose a particular policy of driving actions may be later used for subsequent updating of the agent. Specifically, the agent may have chosen an unexpected policy of driving actions in response to encountering an environmental state that was previously unencountered by the agent. In this situation, it is possible to determine from the generated environmental interpretation which features of the new environmental state caused the agent to choose that particular policy of driving actions. If the chosen policy was undesirable, the agent may then be updated to ensure the undesirable policy is not chosen the next time a similar environmental state is encountered.

Furthermore, as is also shown in FIG. 7, the trained generator module 300 may be included in the autonomous vehicle 10. In an embodiment, the discriminator module 400 is also included in the autonomous vehicle. Although the discriminator module 400 may not actively discriminate the generated environmental interpretations during autonomous driving, the decisions that the discriminator function of the discriminator module would have made on the basis of the generated environmental interpretation received from the generator module, and the real environmental state received from the sensor, can be stored in a memory 401. This memory could then be used to periodically update the discriminator function (and thereby also the generator function) based on "in-use" driving data.

Figure 8:
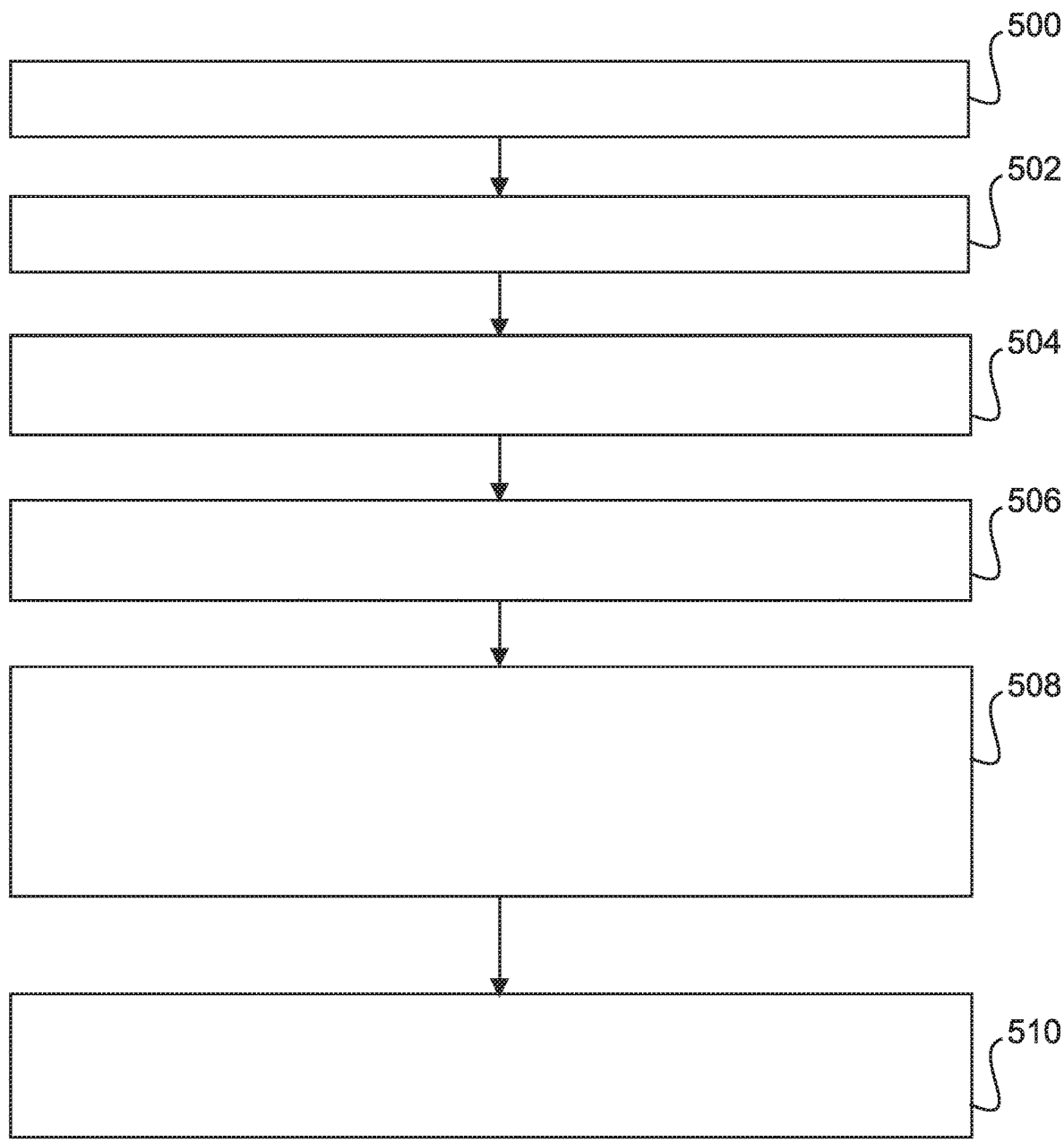
FIG. 8 is a flowchart illustrating a training method for an autonomous agent, in accordance with various embodiments.

In order to summarize the training process described above, a flowchart of the learning process is shown in FIG. 8. At step 500, information from the driver demonstrations 200 is extracted. In an embodiment, this extraction is performed using a neural network. At step 502, this information is transmitted to a generator module 300. At step 504, the real environmental state is transmitted to a discriminator module 400. At step 506, the generator module 300 generates environmental state interpretations from the extracted information. At step 508, the generator and discriminator modules are both trained such that the discriminator learns to better discriminate between generated environmental interpretations and realistic environmental states. At step 510, a reward map is recovered from the driver demonstrations, using generated environmental state interpretations from the trained generator. This reward map 220 may be recovered through the use of DIRL agent 215.

In various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. In various embodiments, the operating environment further includes one or more user devices that communicate with the autonomous vehicle 10 and/or a remote transportation system via a communication network.

The communication network may support communication as needed between devices, systems, and components supported by the operating environment (e.g., via tangible communication links and/or wireless communication links). For example, the communication network can include a wireless carrier system such as a cellular telephone system that includes a plurality of cell towers (not shown), one or more mobile switching centers (MSCs) (not shown), as well as any other networking components required to connect the wireless carrier system with a land communications system. Each cell tower includes sending and receiving antennas and a base station, with the base stations from different cell towers being connected to the MSC either directly or via intermediary equipment such as a base station controller. The wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system, a second wireless carrier system in the form of a satellite communication system can be included to provide uni-directional or bi-directional communication with the autonomous vehicles. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle and the station. The satellite telephony can be utilized either in addition to or in lieu of the wireless carrier system.

A land communication system may further be included that is a conventional land-based telecommunications network connected to one or more landline telephones and connects the wireless carrier system to the remote transportation system. For example, the land communication system may include a public switched telephone network (PSTN) such as that used to provide hardwired telephony, packet-switched data communications, and the Internet infrastructure. One or more segments of the land communication system can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system need not be connected via the land communication system, but can include wireless telephony equipment so that it can communicate directly with a wireless network, such as the wireless carrier system.

Embodiments of the operating environment can support any number of user devices, including multiple user devices owned, operated, or otherwise used by one person. Each user device supported by the operating environment may be implemented using any suitable hardware platform. In this regard, the user device can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device supported by the operating environment is realized as a computer-implemented or computer-based device having the hardware, software, firmware, and/or processing logic needed to carry out the various techniques and methodologies described herein. For example, the user device includes a microprocessor in the form of a programmable device that includes one or more instructions stored in an internal memory structure and applied to receive binary input to create binary output. In some embodiments, the user device includes a GPS module capable of receiving GPS satellite signals and generating GPS coordinates based on those signals. In other embodiments, the user device includes cellular communications functionality such that the device carries out voice and/or data communications over the communication network using one or more cellular communications protocols, as are discussed herein. In various embodiments, the user device 54 includes a visual display, such as a touch-screen graphical display, or other display.

The remote transportation system includes one or more backend server systems, which may be cloud-based, network-based, or resident at the particular campus or geographical location serviced by the remote transportation system. The remote transportation system can be manned by a live advisor, or an automated advisor, or a combination of both. The remote transportation system can communicate with the user devices and the autonomous vehicles to schedule rides, dispatch autonomous vehicles, and the like. In various embodiments, the remote transportation system stores account information such as subscriber authentication information, vehicle identifiers, profile records, behavioral patterns, and other pertinent subscriber information.

In accordance with a typical use case workflow, a registered user of the remote transportation system can create a ride request via the user device. The ride request will typically indicate the passenger's desired pickup location (or current GPS location), the desired destination location (which may identify a predefined vehicle stop and/or a user-specified passenger destination), and a pickup time. The remote transportation system receives the ride request, processes the request, and dispatches a selected one of the autonomous vehicles (when and if one is available) to pick up the passenger at the designated pickup location and at the appropriate time. The remote transportation system can also generate and send a suitably configured confirmation message or notification to the user device, to let the passenger know that a vehicle is on the way.

As can be appreciated, the subject matter disclosed herein provides certain enhanced features and functionality to what may be considered as a standard or baseline autonomous vehicle and/or an autonomous vehicle based remote transportation system. To this end, an autonomous vehicle and autonomous vehicle based remote transportation system can be modified, enhanced, or otherwise supplemented to provide the additional features described in more detail below.

In accordance with various embodiments, a controller implements an autonomous driving system (ADS). The controller may include the above-described trained autonomous agent. That is, suitable software and/or hardware components of the controller (e.g., a processor and a computer-readable storage device) are utilized to provide an autonomous driving system that is used in conjunction with the vehicle 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A computer-implemented method of training an autonomous driving agent of a vehicle with actuators, the method comprising the steps of:
    extracting, by at least one processor, information from demonstrations of driving behavior using a neural network;
    recovering, by the at least one processor, a reward map from the extracted information;
    transmitting the extracted information to a generator module;
    transmitting a real environmental state associated with the demonstrations of driving behavior and the recovered reward map to a discriminator module;
    generating, by the at least one processor, environmental state interpretations from the extracted information using the generator module;
    training, by the at least one processor, the discriminator module to better determine whether the generated environmental state interpretations correspond to the real environmental state, while training, by the at least one processor, the generator module to generate an improved environmental state interpretation that the discriminator determines to correspond to the real environmental state; and
    operating, by the at least one processor using the improved environmental state interpretation, the vehicle using the actuators.

2. The method of claim 1, wherein the extracted information is extracted using a convolutional neural network.

3. The method of claim 1, wherein the reward function is recovered using deep inverse reinforcement learning via a deep inverse reinforcement learning module.

4. The method of claim 1, wherein the training of the discriminator module is performed using a loss or cost gradient function.

5. The method of claim 1, wherein the training of the generator module is performed using a loss or cost gradient function.

6. The method of claim 1, wherein the vehicle includes a sensor, and wherein the sensor comprises an optical camera, a LIDAR system, and/or a RADAR system.

7. A system for training an autonomous driving agent of a vehicle with actuators, the system comprising:
    a neural network configured to extract information from demonstrations of driving behavior;
    a deep inverse reinforcement learning module configured to recover a reward map from the extracted information;
    a generator module configured to generate an environmental state interpretation on the basis of the extracted information;
    a discriminator module configured to use the recovered reward map, at least in part, to determine if the generated environmental state interpretation corresponds to a real environmental state associated with the extracted information; and
    a processor configured to operate the vehicle using the actuators and based on the generated environmental state interpretation.

8. The system of claim 7, wherein the neural network comprises a deep convolutional neural network.

9. The system of claim 7, comprising a reward recovery module, wherein the reward recovery module is configured to recover the reward map via deep inverse reinforcement learning.

10. The system of claim 7, wherein the discriminator module is configured to iteratively improve the determination of whether the generated environmental state interpretation corresponds to a realistic environmental state on the basis of a loss or cost function.

11. The system of claim 10, comprising a loss or cost function,
    wherein the generator module is configured to iteratively improve the form of the generated environmental state interpretation such that the discriminator module would determine that the generated environmental state interpretation corresponds to a realistic environmental state, on the basis of the loss or cost function.

12. The system of claim 7, comprising a sensor, wherein the sensor comprises an optical camera, a lidar system and/or a radar system.

13. A vehicle in which the trained autonomous driving agent of claim 1 is deployed, comprising:
    a sensor configured to sense information relating to features of an environment state surrounding the vehicle;
    a neural network configured to extract information from the sensor information;
    wherein the trained autonomous driving agent is configured to determine a policy of driving actions based on the extracted information; and
    a trained generator module configured to generate at least one of the environmental state interpretations on the basis of the extracted information.

14. The vehicle of claim 13, further comprising a discriminator module configured to determine if the generated environmental state interpretation corresponds to a realistic environmental state, wherein the discriminator module is further configured to store the determination in a memory.

15. The vehicle of claim 14, wherein the discriminator module is configured to store, in a memory, the generated environmental interpretation and the associated real environmental state upon which the generated environmental interpretation was based.

16. The vehicle of claim 13, wherein the sensor comprises an optical camera, a lidar system and/or a radar system.

17. The vehicle of claim 13, wherein the neural network is a deep convolutional neural network.

* * * * *